United States Patent [19]
Plessala

[11] Patent Number: 5,655,856
[45] Date of Patent: Aug. 12, 1997

[54] STOCK GUIDE

[76] Inventor: Dickie M. Plessala, Rte. 5, Box 756-C, Orange, Tex. 77630

[21] Appl. No.: 444,375

[22] Filed: May 18, 1995

[51] Int. Cl.⁶ .................................................. B23G 5/04
[52] U.S. Cl. ..................... 408/221; 470/185; 408/239 R
[58] Field of Search ................................... 408/215, 221, 408/238, 239 R; 470/67, 185, 187

[56] References Cited

U.S. PATENT DOCUMENTS

| | | | |
|---|---|---|---|
| 1,488,270 | 3/1924 | Miller | 470/185 |
| 1,613,980 | 1/1927 | Boyd | 408/215 |
| 3,004,270 | 10/1961 | Cowley | 408/239 R |
| 3,715,168 | 2/1973 | Kuhn | 408/239 R |
| 4,856,946 | 8/1989 | Park | 408/122 |
| 4,927,302 | 5/1990 | Beaty | 470/185 |
| 5,490,746 | 2/1996 | Baker | 408/221 |

FOREIGN PATENT DOCUMENTS

| | | | |
|---|---|---|---|
| 263771 | 4/1988 | European Pat. Off. | 470/185 |
| 1043030 | 11/1958 | Germany | 470/185 |
| 4218687 | 7/1993 | Germany | 470/185 |
| 402024024 | 1/1990 | Japan | 470/185 |
| 566692 | 8/1977 | U.S.S.R. | 408/240 |

*Primary Examiner*—Steven C. Bishop
*Attorney, Agent, or Firm*—Richard C. Litman

[57] ABSTRACT

A apparatus to orient stock with respect to a threading die. One embodiment of the apparatus detachably mounts to a die and receives and aligns stock prior to its introduction into the threading zone of the die. A second embodiment is an improvement to an extant tool including a die holder having a threading zone, a retaining plate and ratchet adaptor mounted to the retaining plate. The retaining plate alone receives and aligns stock prior to its introduction into the threading zone.

2 Claims, 3 Drawing Sheets

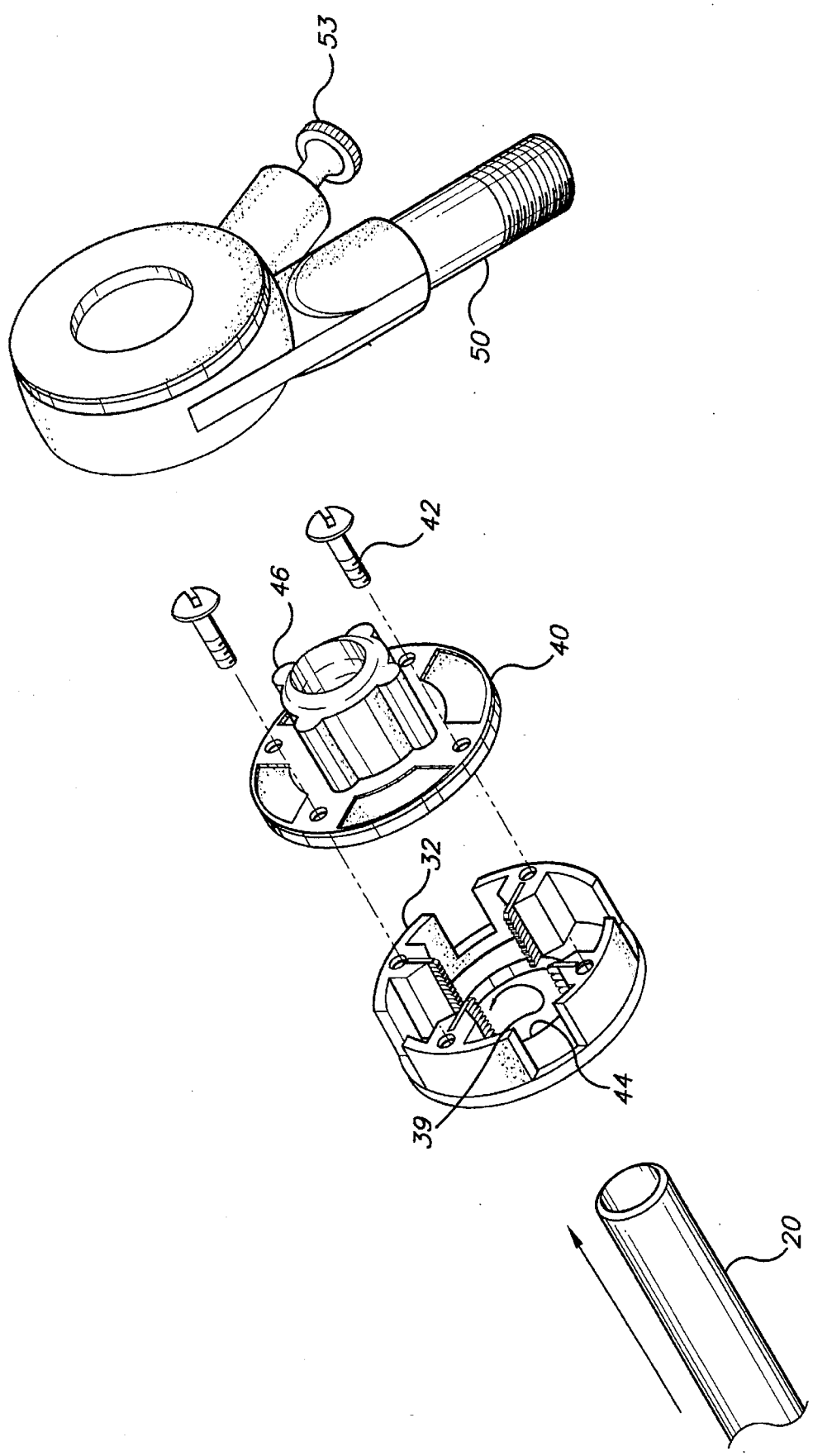

STOCK GUIDE

BACKGROUND OF THE INVENTION

1. Field of the Invention

This invention relates to machining fixtures. Specifically, the present invention relates to apparatuses for orienting pipe and rod stock with respect to a threading die during threading operations, especially where such is performed in close quarters.

2. Description of the Prior Art

Threaded pipe or rod stock is used in a wide range of industrial applications. Although many mechanisms and tools exist for imparting threads to stock, some stock configurations render threading difficult. Manufacturers need to be able to control thread orientation because thread orientation is crucial in precision assemblies. Thread orientation on stock is most easily accomplished by fixtures which orient the stock with respect to title threading die.

Stock guides are mentioned in the literature, but none are as simple or effective as the present invention. For example, U.S. Pat. No. 3,004,270, issued Oct. 17, 1961, to William E. Cowley describes a die holder in which dies may be secured while permitting the thread cutters to receive stock. On the other hand, Cowley's invention permits stock to be received whether or not aligned with respect to the die.

U.S. Pat. No. 3,715,168, issued Feb. 6, 1973, to Russell P. Kuhn, describes a die holder detachably mounted to a hexagonal, manual- or power-driven socket. Similar to Cowley's invention, Kuhn's invention permits stock to be received whether or not aligned with respect to the die.

U.S. Pat. No. 4,856,946, issued Aug. 15, 1989, to Hong K. Park, describes a thread alignment apparatus which has an alignment means including a conically-shaped guide which inserts into a conically-shaped recess disposed within a ratchet that drives a threading die. Parks invention aligns the die relative to the stock. However, the stock must be introduced into a fixture which lust be aligned with respect to the die. Parks invention does not guide or align the stock itself, but rather the tool once the stock has been positioned. Absent this prior alignment of fixture to die, Parks invention has the potential of receiving stock whether or not aligned with respect to the die.

The abstract for Soviet Union Pat. No. 566692, published Aug. 9, 1977, and issued to Tula Machine Consolidated Works (TMCW) describes an apparatus which facilitates threading stock in restricted environments. TMCW's invention does not appear to address alignment of the stock with respect to the die.

None of the above references, taken alone or in combination, are seen as teaching or suggesting the presently claimed stock guide.

SUMMARY OF THE INVENTION

The present invention is a means to orient stock with respect to a threading die. The die has thread cutters disposed within a central aperture of the die defining a threading zone. One embodiment of the invention includes a plate having an aperture configure to be slightly larger than the stock targeted for thrading. The aperture is in registration with the threading zone. The plate may have annular flanges for maintaining a predetermined distance between the die and the plate. The flanges have gaps between for providing outlets for chips produced during threading.

A second embodiment of the invention is a modification to an extant tool. The tool includes a die holder having a central aperture. The die holder receives a plurality of radially oriented dies extending into the central aperture and defining a threading zone. A retention plate having a central aperture in registration with the threading zone secures to and maintains the dies against the die holder. A ratchet adaptor having a central aperture in registration with the threading zone is mounted to the die holder. A ratchet tool receives the ratchet adaptor for driving the tool while threading stock. The ratchet tool has a central throughbore in registration with the threading zone. The central apertures in the die holder, retention plate and ratchet adaptor and the throughbore in the ratchet tool are configured to be slightly larger than the stock targeted for threading. Stock is fed into the ratchet too, ratchet adaptor and die holder prior to entering the threading zone.

The present modification removes the ratchet adaptor from the die holder and mounts it on the retention plate. In operation, the ratchet adaptor is received in the ratchet tool as before. However, the stock is not fed through the ratchet tool, rather the central aperture in the die holder. This modification reduces the distance, "feed distance" hereafter, which the stock must travel through the tool in order to reach the threading zone. Reduced feed distance facilitates threading smaller stock targets. Reduced feed distance also permits threading operations in close quarters heretofore inaccessible by the prior art.

In consideration of the above, an object of the invention is to provide a simple and continuous means to align stock with respect to a threading die.

Another object of the invention is to provide a means to align stock or threading small stock targets.

A further object of the invention is to provide an apparatus for conducting threading operations in close quarters.

Yet another object of the invention is to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 3 is an exploded view of the second embodiment of the invention.

Similar reference characters denote corresponding features consistently throughout the attached-drawings.

DETAILED DESCRIPTION OF THE PREFERRED EMBODIMENTS

Figure 1:
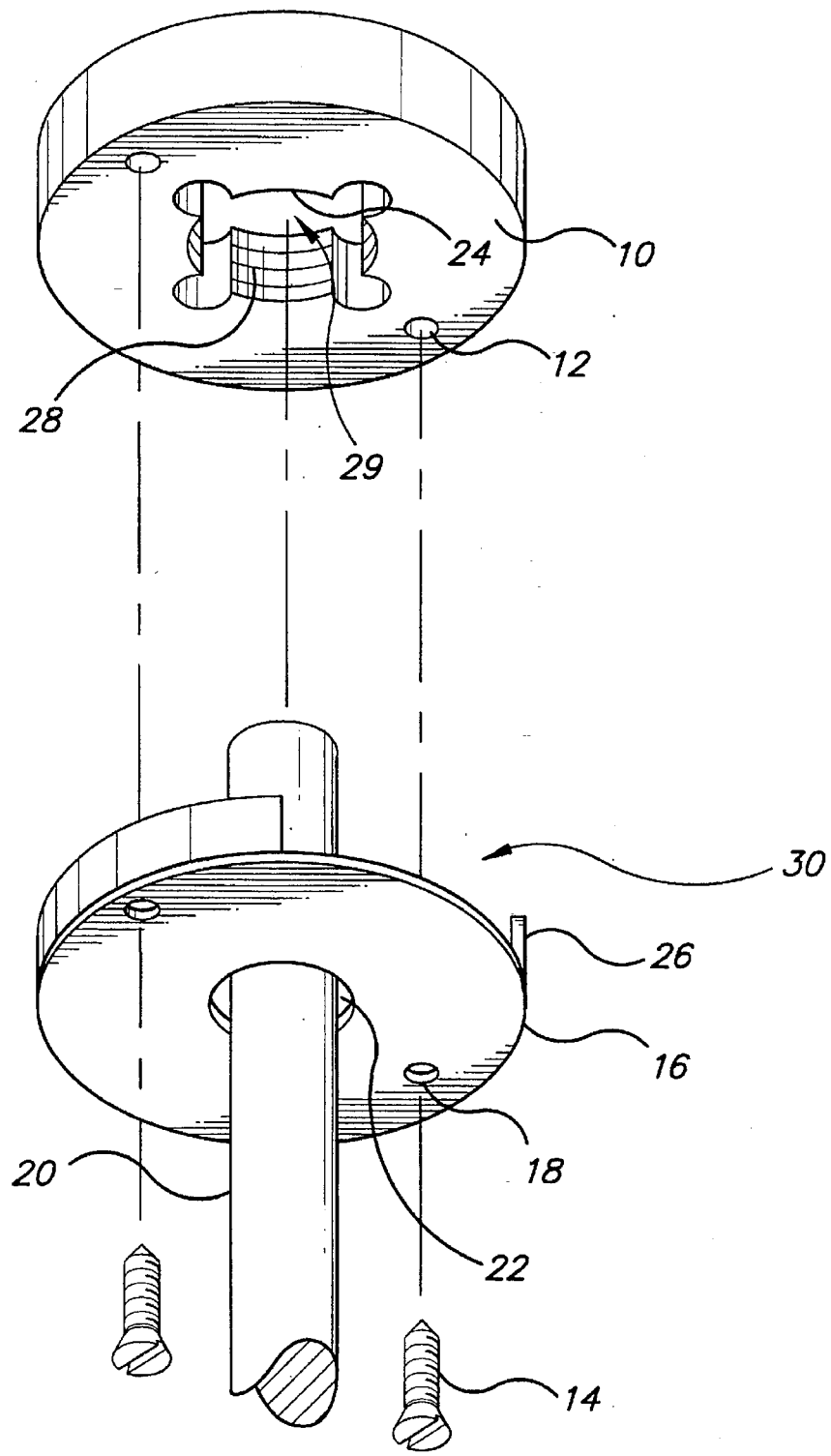
FIG. 1 is an exploded view of a first embodiment of the invention shown interfacing with a die and receiving stock.

Referring to FIG. 1, a first embodiment of the invention is shown. The die 10 is shown having two threaded bores 12. Plate 16 is shown having two throughbores 18. The plate 16 is shown secured to the die 10 with threaded fasteners 14. Any equivalent fastening means ray be adapted for mounting the plate 16 to the die 10.

The die 10 also is shown having an aperture 24 into which extend thread cutters 28 thereby defining a threading zone 29. When stock 20 is fed into the threading zone 29, the thread cutters 28 impart the stock 20.

Plate 16 is shown having a central aperture 22 for receiving stock 20. The plate 16 is secured to die 10 with the threaded fasteners 14. The central aperture 22 is in registration with the threading zone 29 of the die 10. Stock 20 passes through throughout 22 and is received in the threading zone 29 having been aligned prior to its reception.

The plate 16 is shown including annular flanges 26. The flanges 26 are configured to maintain a pre-determined distance between die 10 and plate 16. Longer flanges 26 that define a greater distance between die 10 and plate 16 enhance alignment precision. The gaps 30 between flanges 26 provide outlets for chips produced during threading.

Figure 2:
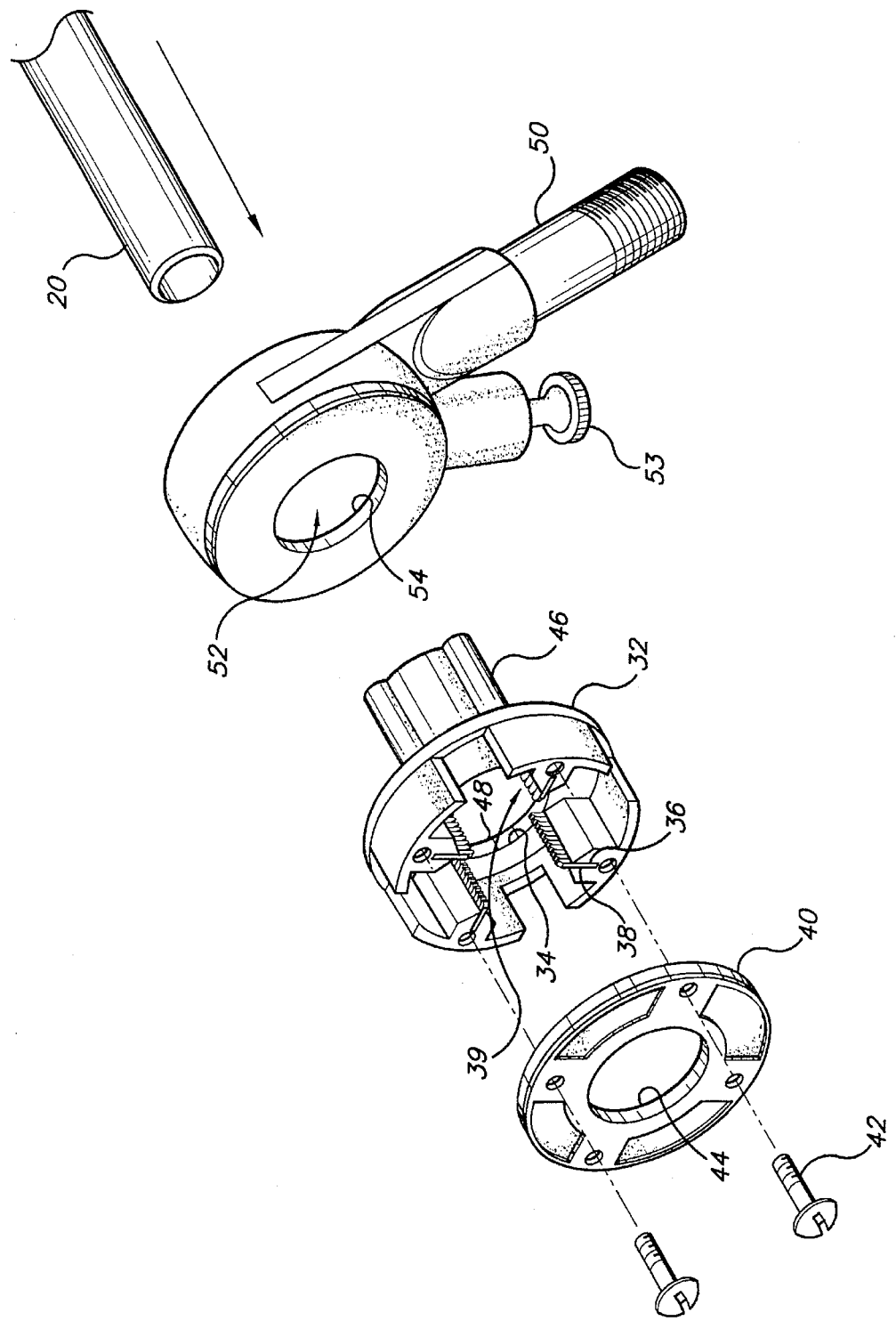
FIG. 2 is an exploded view of the prior art over which a second embodiment of the invention advances.

Referring to FIGS. 2 and 3, the prior art and a second embodiment on the invention, an improvement to the prior art, are shown, respectively. The current tool includes a die holder 32 having a central aperture 34. The die holder 32 has a plurality of radial slots 36 having axes parallel to the central axis. Each slot 36 receives a die 38. The dies 38 radially extend into the aperture 34 and define a threading zone 39 for receiving and threading stock 20. The dies 38 are oriented in the die holder such that stock should be fed only in the direction shown. Different sized dies (not shown) may be substituted for each die 38 for threading differently sized stock (not shown).

A retention plate 40 is mounted to the die holder 32 with threaded fasteners 42. The retention plate 40 retains each die 38 within each slot 36. The retention plate 40 has a central aperture 44 dimensioned and configured to be slightly larger than the stock targeted for threading. The central aperture 44 is in registration with the threading zone 39.

A ratchet adaptor 46 is mounted to the die holder 32. The ratchet adaptor 46 has a central aperture 48 dimensioned and configured to be slightly larger than the stock targeted for threading. The central aperture 48 in registration with the threading zone 39.

A ratchet tool 50 has a ratchet coupling 52 for engaging with the ratchet adaptor 46. The ratchet adaptor 46 may be selectably disengaged and removed by actuation of a control knob 53. The ratchet tool 50 has a throughbore 54 in registration with the threading zone 39.

In operation, stock 20 is fed through the throughbore 54 of the ratchet tool 50 and into the aperture 48 of the ratchet adaptor 46. The stock 20 is advanced into the threading zone 39 and threaded by the dies 38. After having been threaded, the stock 20 is received through the aperture 44 in the retention plate 40.

The present modification removes the ratchet adaptor 46 from the die holder 32 and mounts it on the retention plate 40. In operation the stock 20 is fed through the central aperture 44 into the threading zone 39. The modification provides for feeding the stock 10 in the proper direction for feeding stock 20 through the dies 38, as discussed above. The present invention is not limited to threading stock 20 having sufficient length to pass through the central apertures of the ratchet tool 50, ratchet adaptor 46 and retention plate 40 prior to reaching the threading zone 39. The modification facilitates threading small stock targets otherwise unthreadable with the prior art. The novel device also facilitates threading operations in close quarters.

The present invention is not intended to be limited to the embodiments described above, but to encompass any and all embodiments within the scope of the following claims.

I claim:

1. A tool for use with a threading die having an aperture and including thread-cutting teeth disposed within the aperture defining a threading zone, the die further including threaded holes disposed about the aperture, said tool comprising:

a plate having a bore in registration with the threading zone in the die, said bore for slidingly receiving stock, said plate having a periphery, and said plate having throughbores therethrough disposed about the bore in alignment with the threaded holes in the die;

an annular flange extending from the periphery of said plate, said flange disposed between said plate and the die for maintaining a predetermined distance between said plate and the die, said flange having openings therethrough for providing outlets for chips produced during threading of stock; and threaded fasteners, each said threaded fastener passing through one of the throughbores and engaging one of the threaded holes to secure said plate to the die;

whereby said plate receives and aligns stock with respect to and prior to its introduction into the threading zone.

2. A tool for threading stock comprising:

a die holder having a first central aperture;

a plurality of radially diverged dies disposed within said die holder, said dies extending radially into said central aperture to define a threading zone;

a retention plate having a second central aperture dimensioned and configured to slidingly receive stock, said second central aperture being in registration with said threading zone, said retention plate being demountably fixed to said die holder for maintaining the dies within the die holder; and a ratchet adaptor for receiving a ratchet tool, said ratchet adapter having a third central aperture dimensioned and configured to slidingly receive stock, said third central aperture being in registration with said threading zone, said ratchet adaptor mounted on said retention plate;

whereby said retention plate receives and aligns stock with respect to and prior to its introduction into said threading zone.

* * * * *